United States Patent
Maillot

[11] 4,028,567
[45] June 7, 1977

[54] ELECTROMAGNETIC VIBRATION-DETECTOR DEVICE, IN PARTICULAR FOR ANTI-THEFT PURPOSES

[75] Inventor: Jean Maillot, Paris, France

[73] Assignee: Paulette Guterman, Gif sur Yvette, France

[22] Filed: Apr. 9, 1976

[21] Appl. No.: 675,513

[30] Foreign Application Priority Data

Dec. 23, 1975    France .............................. 75.39550

[52] U.S. Cl. ................................. 310/25; 340/261
[51] Int. Cl.² ....................................... H02K 35/06
[58] Field of Search ................. 310/15, 25, 30, 32, 310/29, 35; 340/261

[56] References Cited
UNITED STATES PATENTS

| | | | |
|---|---|---|---|
| 2,478,712 | 8/1949 | Rockwell | 310/25 X |
| 2,659,857 | 11/1953 | Anderson | 310/15 X |

*Primary Examiner*—Donovan F. Duggan
*Attorney, Agent, or Firm*—Wolf, Greenfield & Sacks

[57] ABSTRACT

The invention concerns an electromagnetic vibration-detector device, in particular for anti-theft, comprising a core which is displaceable in the interior of a winding, said core being secured to the free end of a vibrating blade which is rigidly secured at its other end, the device being characterized in that a thickness of cellular material is stuck on at least one of the faces of the blade, and the thickness of cellular material comprises on its free face a sheet of flexible material.

8 Claims, 1 Drawing Figure

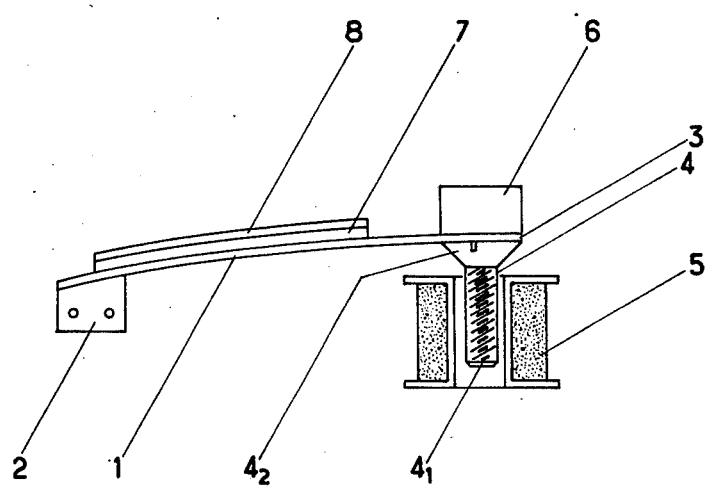

ELECTROMAGNETIC VIBRATION-DETECTOR DEVICE, IN PARTICULAR FOR ANTI-THEFT PURPOSES

The invention concerns an electromagnetic vibration-detector, in particular for anti-theft purposes.

Electromagnetically actuated vibration-detecting devices are already known, which comprise a vibrating blade provided at its free end with a plunger core which is displaceable in the interior of a winding.

In this case, the shocks produced on the vehicle result in vibrations of the blade so that displacement of the core within the coil produces a current which then triggers actuation of an alarm.

However, these known devices suffer from disadvantages in this sense, that any impact on the vehicle causes the alarm to be set off, whereas it would be desirable that only vibrations which are within a given frequency range and which are caused by an attempt to break into the vehicle should be detected.

Thus, with the known devices, vibrations at frequencies which are lower than the break-in frequencies and which are caused for example by wind acting on the vehicle cause untimely actuation of the alarm. Likewise, vibrations at higher frequencies which are caused for example by the clash of bumpers of a vehicle which is maneuvering for parking causes the alarm to be actuated.

The object of the present invention is in particular to overcome these disadvantages. For this purpose, the invention concerns an electromagnetic vibration-detector device, in particular for an anti-theft action, which comprises a plunger core in the interior of the winding, said core being fixed to the free end of a vibrating blade which is rigidly secured at its other end, the device being characterised in that a thickness of cellular material is stuck onto at least one of the faces of the blade, said thickness of cellular material comprising on its free face a sheet of flexible material.

In accordance with another feature of the invention, the cellular material comprises a sheet of synthetic foam.

In accordance with another feature of the invention, the sheet of flexible material is a sheet of synthetic material.

In accordance with another feature of the invention, in its part which dips into the winding, the core comprises a rod provided with surface unevenness.

The invention is illustrated by way of non-limitative example in the accompanying single FIGURE which is a diagrammatic side view of the detector device.

Accordingly, the object of the present invention is to provide an electromagnetic device for detecting vibration of small amplitudes, in a narrow frequency range in which there are normally found the vibrations which are produced when an attempt is made to break into a vehicle. The device of the invention therefore automatically eliminates the lower frequencies which do not correspond to such an attempt.

The device comprises a metal blade 1 which is rigidly fixed at one of its ends by its support 2, while the free end 3 of the blade is provided with a core 4 which extends downwardly into a winding 5 so that vibration of the blade results in a current appearing at the terminals of the winding 5.

In order to achieve the result of the present invention, the applicant has envisaged providing a device such that it has good sensitivity from the electromagnetic point of view, in order to detect even low-amplitude vibrations, and such that, on the other hand, it enjoys a sensitivity in detection which is selective from the mechanical point of view, in order not to react to vibrations whose frequency is above or below the range of frequencies related to a break-in attempt.

In order to achieve improved sensitivity from the electromagnetic point of view, it has been envisaged that the core can be formed by means of a rod $4_1$ which has surface unevenness so as to concentrate the lines of force at the height of the end of such unevenness, and thus to promote detection of any vibration by variation in the field.

Also, the rod $4_1$ is secured to the lower face of the blade 1 which is directed towards the coil 5, by means of a conical portion $4_2$ which concentrates the lines of force produced by the magnet 6 disposed above the blade, in the cylindrical portion $4_1$ which has the surface unevenness.

In the embodiment illustrated, the rod $4_1$ and the conical portion $4_2$ are made in a simple manner by means of a screw with a countersink head whose screw threads form the surface unevenness for concentrating the flux on the turns of the coils.

In this construction, the vibrating blade 1 is made of a magnetically permeable material and the arrangement of the magnet and the screw on opposite faces of the blade 1 provides for easier assembly, for example by gluing, insofar as the force of the magnet holds the screw throughout the time required for gluing the elements to the blade 1.

Selective detection from the mechanical point of view is achieved by providing a thickness of cellular material on at least one of the faces of said blade. The thickness of cellular material is itself covered by a sheet of flexible material. Preferably, the cellular material will comprise the thin sheet of synthetic foam, while the sheet of flexible material will comprise a sheet of plastics material.

In the embodiment shown in the accompanying FIGURE, the sheet of cellular material 7 is thus secured by means of an adhesive substance or a glue, to the upper face of the blade 1, while the sheet of flexible material 8 is fixed to the free face of the sheet 7 of cellular material.

By means of this construction, and taking into account the normal resonance frequency of the blade associated with the magnet and the core 4, the result is a selection of frequencies which are in the range of frequencies corresponding to a break-in, because, when the blade 1 is deflected, the upper face of the blade 7 tends to become elongated, this elongation however being prevented by virtue of the presence of the film of flexible material 8 which is inextensible in respect of the forces involved. This therefore results in a dampening of the vibrations of the blade, and absorption of such vibrations, in particular in respect of the frequencies corresponding to the resonance frequency of the blade 1, in order to prevent self-maintenance on said resonance frequency.

It will be apparent that the invention is not limited to the above-described and illustrated embodiment, on the basis of which other embodiments and other constructions can be envisaged without thereby departing from the scope of the invention.

I claim:

1. An electromagnetic vibration-detector device for anti-theft purposes, comprising a winding, a plunger core in the interior of the winding, a vibrating blade, means for fixing the core to the free end of the blade with the core extending into the winding and being free to vibrate with the blade, means for rigidly securing the other end of the vibrating blade relative to the winding, a thickness of cellular material, and means for securing the cellular material on at least one of the faces of the blade, said thickness of cellular material comprising on its free face a sheet of flexible material.

2. A device according to claim 1, characterised in that the cellular material comprises a thin sheet of synthetic foam.

3. A device according to claim 1, characterised in that the sheet of flexible material is a sheet of synthetic material.

4. A device according to claim 1, characterised in that the core comprises, in its part which is disposed within the winding, a rod provided with surface unevenness.

5. A device according to claim 4, characterised in that the rod is of a conical configuration at its connection to the blade.

6. A device according to claim 4, characterised in that the rod comprises a screw.

7. A device according to claim 4, characterised in that the core comprises a magnet secured to the face of the blade which is remote from the winding, and a rod of magnetically permeable material which is fixed against the face of the blade that is directed towards the winding.

8. A device according to claim 7, characterised in that the blade is of a magnetically permeable material.

* * * * *